United States Patent [19]
Engfer et al.

[11] 3,973,804
[45] Aug. 10, 1976

[54] APPARATUS FOR LOAD-DEPENDENT CONTROL OF VEHICLE

[75] Inventors: Ortwin Engfer, Stuttgart; Eberhard Korkowski, Schwieberdingen, both of Germany

[73] Assignee: Robert Bosch G.m.b.H., Stuttgart, Germany

[22] Filed: Mar. 28, 1975

[21] Appl. No.: 562,927

[30] Foreign Application Priority Data
Apr. 24, 1974 Germany............................ 2419754

[52] U.S. Cl................................. 303/2; 180/82 R; 188/195; 240/7.1 LJ; 303/22 R
[51] Int. Cl.²...................... B60Q 1/10; B60T 8/18; B60T 17/00
[58] Field of Search.................... 303/22, 2, 18, 19; 188/195, 152, 151 R; 240/7.1 LJ; 280/6.1, 6.11, 6 H; 180/82 R, 103

[56] References Cited
UNITED STATES PATENTS
3,415,576 12/1968 Henry-Biabaud............ 303/22 R X
3,425,752 2/1969 Pöllinger et al............... 303/22 A X
3,830,327 8/1974 Hollins............................. 180/82 R
3,840,730 10/1974 Andres et al................... 240/7.1 LJ Primary Examiner—Trygve M. Blix
Assistant Examiner—Douglas C. Butler
Attorney, Agent, or Firm—Edwin E. Greigg

[57] ABSTRACT

A sealed, double valve assembly mounted on a vehicle body is connected to a source of pressurized air and controls the air pressure delivered to two auxiliary systems connected to it. The first auxiliary system is a brake force regulator and the second auxiliary system is a headlight beam adjustment mechanism which uses a pneumatic servo-member.

Control rods connected to the axle change the degree of compression of a control spring in the double valve assembly, thereby opening or closing valves which admit or release compressed air so as to change the operating pressure of the associated auxiliary systems.

3 Claims, 1 Drawing Figure

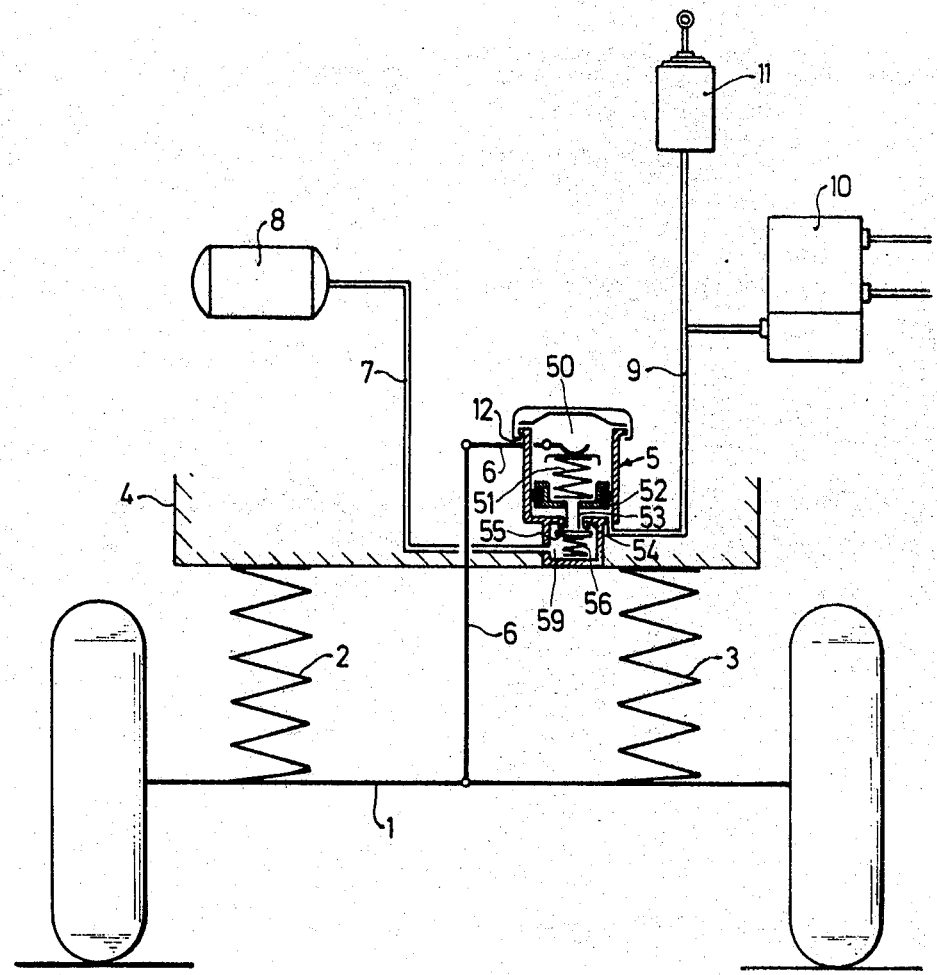

APPARATUS FOR LOAD-DEPENDENT CONTROL OF VEHICLE

BACKGROUND OF THE INVENTION

The invention relates to an apparatus for sensing the load-dependent variable distance between an axle and the body of a motor vehicle, including a system of rods fastened to the vehicle axle and a modulator, actuated by these rods, which controls the supply of a pressurized medium to an auxiliary power system through a control line.

Such an apparatus for an auxiliary powered beam-aiming control for the headlights of motor vehicles is known (Press photograph No. 4622 of Robert Bosch GmbH, Stuttgart KH/VDT 7.73). In this known apparatus, the modulator is a control valve which monitors the alternative communication of a servo-member with either a supply of pressurized air or with the atmosphere.

It is also known to use the above-described apparatus in an auxiliary powered brake-force controller for a motor vehicle braking system which can be adjusted in dependence on load. See, for example, German Auslegeschrift 1,271,567. The known brake force controller is used in vehicles having steel springs and controls the braking pressure in a load-dependent manner when the springs are stressed.

OBJECT AND SUMMARY OF THE INVENTION

It is a principal object of the invention to simplify the control process described above by providing only a single system of control rods and a single modulator for both control processes.

This object is attained, according to the invention, by providing a servo-member of an auxiliary-powered beam-aiming device to be used with the headlights of a motor vehicle as well as an auxiliary-powered brake-force regulator for a load-dependently controllable motor vehicle braking system and to connect both of these mechanisms to a single modulator control line.

The invention will be better understood as well as further objects and advantages will become more apparent from the ensuing detailed specification of a preferred although exemplary embodiment taken in conjunction with the drawing.

BRIEF DESCRIPTION OF THE DRAWING

The single FIGURE of the drawing is a schematic and partially sectional view of a control apparatus according to the invention and of the associated elements of the motor vehicle in which it is installed.

DESCRIPTION OF THE PREFERRED EMBODIMENT

An axle 1 of a motor vehicle (not shown in further detail) is provided with main vehicle springs 2 and 3 which help to support vehicle body 4. Located on the vehicle body 4 is a modulator 5 engaged by control rods 6 which are pivotably attached to and actuated by the vehicle axle 1 when the springs 2 and 3 are stressed.

The modulator 5 includes a control valve assembly with an upper valve chamber 50 and a lower valve chamber 59. The upper valve chamber 50 includes a first control spring 51 and a piston 52 provided with a stem portion forming an outlet valve seat 53.

The lower chamber 59 includes an inlet valve seat 54, a valve closing member 55 and a second control spring 56.

The valve closing member 55 cooperates with the inlet valve seat 54 to form an inlet valve and it cooperates with the outlet valve seat 53 to form an outlet valve.

The part of the upper valve chamber 50 defined by the face of the piston remote from the valve seat 53 is connected to atmospheric pressure by a passage 12. The part of the upper valve chamber 50 defined by the lower face of the piston 52 is connected to a control line 9. The control line 9 communicates with a regulator 10, belonging to a vehicle braking system (not shown) and with a servo-member 11 for aiming the beam of the headlights of the vehicle (not shown).

The lower valve chamber 59 is connected via a line 7 to a storage container 8 containing pressurized air.

The above described apparatus functions as follows:

In any steady, relative position of the vehicle body and the axle, both the inlet valve and the outlet valve are closed as the force of the control spring 51 is balanced by the opposing forces exerted by the air pressure on the piston 52 and by the second control spring 56. Thus, the modulator 5 blocks any communication between the supply line 7 and the control line 9, i.e., from the source of pressurized air to the regulator 10 and to the servo-member 11. If a load is placed on the vehicle body, the springs 2 and 3 are compressed. As a result, the control rods 6 change the setting of the modulator 5 by compressing the first control spring 51, thus opening the inlet valve 54/55 and permitting compressed air to flow from the supply line 7 into the upper chamber 50 and hence to the control line 9 and to the associated regulator 10 and servo-member 11. The compressed air admitted to the upper chamber 50 exerts an additional increasing force on piston 52 which opposes the force of the first control spring 51. When the force of the first control spring 51 is again in equilibrium with the sum of the forces due to the piston 52 and the second control spring 56, the inlet valve closes, blocking any further admission of compressed air from line 7. The increased air pressure in the lower chamber 59 and in the control line 9 provides an auxiliary force for the brake-force regulator 10 which provides a higher braking force and also for the servo-member 11 which lowers the beam of the headlights accordingly.

On the other hand, when the load on the vehicle body 4 is decreased, the springs 2 and 3 are relieved, as is the first control spring 51. The unbalance of forces in the first valve chamber causes the piston 52 to move upwardly, opening the outlet valve 53/55 which permits pressurized air to escape from the lower chamber 59, and hence from control line 9, to the atmosphere through the center of the piston 52 and the passage 12 until a balance of forces is again established and the outlet valve 53/55 closes again. The reduced pressure now present in the control line causes the regulator 10 to provide a decreased braking force and it causes the servo-member 11 to raise the beam of the headlights. Thus, in general, the modulator 5 admits a control pressure into the control line 9 in proportion to the degree of compression of the main vehicle springs 2 and 3. The air flow through the modulator 5 is made so small that normal oscillations of the axle during the motion of the vehicle do not substantially change the pressure level in the control line 9.

It may be seen that two vehicle control processes, i.e., the adjustment of the brake force regulator 10 as well as the resetting of the servo-member 11 are accomplished by using only one modulator 5 and only one set of control rods 6 and that these control rods represent the only link with the vehicle axle 1.

Thus the equipment is simplified and made less expensive.

What is claimed is:

1. An apparatus for load-dependent pressure regulation in a vehicle, said vehicle including axle means and body means as well as spring means for elastic coupling of said body means to said axle means, and also including a brake system and adjustable headlamp mounting means, said apparatus comprising:

pressure modulator means mounted on the body of the vehicle and containing movable control members;

control linkage rods, attached pivotably to said axle means and to said pressure modulator means for displacing said movable elements in said pressure modulator means in dependence on the distance between said body and said axle;

a source of pressurized fluid, connected to said pressure modulator to provide pressurized fluid thereto;

a brake force regulator, connected to said pressure modulator to receive pressurized fluid therefrom and connected to said brake system for adjusting the braking force exerted by the brake system of the vehicle; and a pneumatic servo-member, connected to said pressure modulator and to said adjustable headlamp mounting means, for changing the position of said adjustable headlamp mounting means in relation to pressure, said modulator providing a load-dependent control pressure to said brake force regulator and to said pneumatic servo-member; whereby the braking force exerted by the brakes and the position of said adjustable headlamp mounting means are simultaneously adjusted in load-dependent manner 2. An apparatus as defined in claim 1, wherein said pressure modulator means includes a double valve assembly with a first valve control spring, said linkage rods being connected to one of said movable control members of said modulator means to change the valve-closing compression of said first valve control spring.

3. An apparatus as defined in claim 2, wherein said valve assembly further includes a second valve control spring whose compressive force opposes said first valve control spring.

* * * * *